(12) United States Patent
Zhu et al.

(10) Patent No.: US 10,748,361 B1
(45) Date of Patent: Aug. 18, 2020

(54) METHOD AND DEVICE TO PREVENT RELAY ATTACKS IN REMOTE VEHICLE ENTRY SYSTEM

(71) Applicant: Kabushiki Kaisha Toshiba, Minato-ku (JP)

(72) Inventors: Ziming Zhu, Bristol (GB); Mohammud Zubeir Bocus, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 16/361,901

(22) Filed: Mar. 22, 2019

(51) Int. Cl.
  *G07C 9/00* (2020.01)
  *B60R 25/24* (2013.01)

(52) U.S. Cl.
  CPC ........ *G07C 9/00309* (2013.01); *B60R 25/241* (2013.01); *G07C 2009/00555* (2013.01); *G07C 2209/63* (2013.01)

(58) Field of Classification Search
  CPC ...... G07C 9/00309; G07C 2009/00555; G07C 2209/63; B60R 25/241
  USPC ........................................................ 340/5.71
  See application file for complete search history.

(56) References Cited

U.S. PATENT DOCUMENTS

| | | | | |
|---|---|---|---|---|
| 8,935,052 B2 * | 1/2015 | Hermann | ................ | B60R 25/20 701/45 |
| 9,384,607 B1 * | 7/2016 | Copeland | ........... | G07C 9/00309 |
| 9,972,150 B2 * | 5/2018 | Da Deppo | ............... | G07C 9/28 |
| 10,176,368 B1 * | 1/2019 | Ramakrishnan | ... | G07C 9/00309 |
| 2008/0164973 A1 * | 7/2008 | Mamaloukas | ..... | G07C 9/00309 340/5.7 |
| 2008/0169900 A1 * | 7/2008 | Mullet | ............... | G07C 9/00309 340/5.71 |
| 2009/0237202 A1 * | 9/2009 | Mullet | ............... | G07C 9/00182 340/5.7 |
| 2010/0052931 A1 * | 3/2010 | Kolpasky | ................ | B60R 25/00 340/670 |
| 2011/0218709 A1 * | 9/2011 | Hermann | ................ | B60R 25/20 701/45 |
| 2011/0309912 A1 * | 12/2011 | Muller | .................. | B60R 25/246 340/5.72 |
| 2013/0237193 A1 * | 9/2013 | Dumas | ............... | G07C 9/00571 455/414.1 |
| 2014/0049361 A1 * | 2/2014 | Ahearn | ..................... | G07C 9/28 340/5.7 |
| 2016/0042767 A1 * | 2/2016 | Araya | ..................... | G11B 19/02 386/201 |
| 2017/0282856 A1 * | 10/2017 | Riedel | ..................... | B60R 25/25 |
| 2017/0352211 A1 * | 12/2017 | Asmar | ..................... | B60R 25/04 |

(Continued)

FOREIGN PATENT DOCUMENTS

KR  10-1783151 B1  9/2017

*Primary Examiner* — Ojiako K Nwugo
(74) *Attorney, Agent, or Firm* — Oblon, McClelland, Maier & Neustadt, L.L.P.

(57) ABSTRACT

A method of remotely controlling access to a resource. The method comprising receiving a plurality of signals from a remote key wherein the remote key only transmits the plurality of signals if the remote key is moving. The method further comprises estimating a first and a second position of the remote key based on a characteristic of a first and a second signal respectively, and unlocking access to the resource if the remote key is moving towards the resource based on the first and the second estimated position.

6 Claims, 10 Drawing Sheets

(56) References Cited

U.S. PATENT DOCUMENTS

2018/0215344 A1\* 8/2018 Santora ............... H04N 5/2258
2019/0026483 A1\* 1/2019 Boireau ................ G06F 21/35

\* cited by examiner

METHOD AND DEVICE TO PREVENT RELAY ATTACKS IN REMOTE VEHICLE ENTRY SYSTEM

FIELD

Embodiments described herein relate generally to a method of remotely controlling access to a resource and corresponding devices for use in such remote key entry systems.

BACKGROUND

Over the past few years vehicle manufacturers have started to produce vehicles which use remote key entry. Remote key entry systems typically comprise a control unit located within a vehicle and a number of remote keys which are authorised to unlock vehicle access provided these keys are within a range of the control unit. In practice, the mechanism of unlocking vehicle access also comprises the exchange of authorisation messages by a short range communication link.

While the ability to remotely unlock a vehicle has enabled unrivalled convenience for an authorised party, it has also created a number of security vulnerabilities which could be exploited by an unauthorised party.

One way for an unauthorised party to gain access to a vehicle employing a remote key entry system is to use a relay attack. Relay attacks typically involves two radio transceivers which, in essence, extend the distance from the vehicle which the remote key of an authorised user can unlock vehicle access and/or functionality. By employing a relay attack in this way an unauthorised party is able to gain access to a user's vehicle.

In light of this a new approach to remote key entry is required which prevents unauthorised users from accessing a resource while still being easy and convenient for the user to use.

Arrangements of the present invention will be understood and appreciated more fully from the following detailed description, made by way of example only and taken in conjunction with drawings in which.

DETAILED DESCRIPTION

According to a first aspect of the invention there is provided a method of remotely controlling access to a resource. The method comprises receiving a plurality of signals from a remote key wherein the remote key only transmits the plurality of signals if the remote key is moving, estimating a first and a second position of the remote key based on a characteristic of a first and a second signal respectively, and unlocking access to the resource if the remote key is moving towards the resource based on the first and the second estimated position.

In an embodiment the remote key determines a speed of movement and only transmits the first and the second signal if the speed of movement is within a predetermined range.

Optionally, the predetermined range is a range of average walking speeds.

In a further embodiment each signal of the plurality of signals comprises motion data generated by the remote key. In this embodiment the method further comprises: calculating an expected relative position change of the remote key based on the motion data contained within the plurality of received signals, calculating an observed relative position change based on the difference between the first and the second position, and unlocking access to the resource if the expected relative position change is consistent with the observed relative position change.

Preferably, the motion data comprises information describing a movement of the remote key. In an embodiment the motion data is in the same frame of reference as the observed relative position change.

Optionally, the motion data is represented in the earth frame.

In an embodiment the motion data comprises one or more of: accelerometer readings, gyroscope readings and magnetometer readings.

In a different embodiment the plurality of received signals comprises the expected relative position change.

In an embodiment the expected relative position change is consistent with the observed relative position change when the expected relative position change is within a percentage error of the observed relative position change, or vice versa.

Optionally, the expected relative position change and the observed relative position change are consistent if each axis in the coordinate system is within a percentage error of each other.

In a further embodiment the first signal is a least recent signal of the plurality of signals received from the remote key and the second signal is a most recent signal of the plurality of signals received from the remote key.

In a further embodiment each signal further comprises a sender identification number and unlocking access to the resource further comprises determining if the sender identification number is associated with an authorised user.

In an embodiment the method further comprises comparing the expected relative position change with a movement signature associated with the sender identification number. In this embodiment access to the resource is unlocked if the movement signature is consistent with the expected relative position change.

In an embodiment access to the resource is locked if a number of failed attempts associated with a sender identification number is above a predetermined threshold.

In an embodiment estimating a first and a second position of the remote key comprises applying a signal source localisation technique to a signal received by a plurality of antennae.

In an embodiment the remote key transmits the second signal after a predetermined time has elapsed since transmitting the first signal.

In an embodiment the method of remote key entry further comprises transmitting a first and a second authorisation message request. In this embodiment the remote key transmits the first and the second signal in response to receiving the first and the second authorisation message request respectively.

In a further embodiment the plurality of signals comprises at least three signals and the method further comprises: calculating an expected relative position change and an observed relative position change between each set of successive signals in the plurality of received signals, and, unlocking access to the resource if the expected relative position change is consistent with the observed relative position change for each set of successive signals.

According to a second aspect of the invention there is provided a remote key comprising: a sensor module configured to measure motion data, a communication module configured to transmit a signal, and a processor configured to: instruct the communication module to transmit an authorisation message only when the remote key is moving.

In an embodiment the processor only instructs the communication module to transmit an authorisation message when the remote key is moving at a predetermined range of speeds.

Optionally, the predetermined range of speeds is a range of average walking speeds.

In an embodiment the processor is further configured to obtain motion data from the sensor module and instruct the communication module to transmit an authorisation message comprising the motion data.

In another embodiment the sensor module comprises one or more of: an accelerometer, a gyroscope and a magnetometer.

In a further embodiment the authorisation message further comprises a sender identification number.

In an embodiment the communication module is further configured to receive a request for authorisation message, and, in response receiving the request for authorisation message the processor is configured to instruct the control module to transmit the authorisation message.

According to a third aspect of the invention there is provided a control unit for remote key entry comprising a plurality of antennas configured to receive a plurality of signals from a remote key, a control output configured to unlock access to a resource. There is also provided a processor configured to: estimate a first and a second position of the remote key based on a characteristic of a first and a second signal respectively, determine if the remote key is moving towards the resource based on the first and the second estimated position, and instruct the control output to unlock access to the resource when the remote key is moving towards the resource.

In an embodiment the processor is further configured to: calculate an expected relative position change of the remote key based on motion data contained within the plurality of received signals, calculate an observed relative position change based on the difference between the first and the second position, and instruct the control output to unlock access to the resource if the expected relative position change is consistent with the observed relative position change.

Optionally, the motion data comprises one or more of: accelerometer readings, gyroscope readings and magnetometer readings.

In an embodiment the first signal is a least recent signal of the plurality of signals received from the remote key and the second signal is a most recent signal of the plurality of signals received from the remote key.

In an embodiment each signal further comprises a sender identification number. In this embodiment the processor is further configured to: determine if the sender identification number is associated with an authorised user, and instruct the control output to unlock access to the resource when the sender identification number is associated with an authorised user.

In an embodiment the processor is further configured to compare the expected relative position change with a movement signature associated with the sender identification number, and, instruct the control output to unlock access to the resource when the expected relative position change is consistent with the movement signature.

In a further embodiment the plurality of signals comprises at least three signals and the processor is further configured to: calculate an expected relative position change and an observed relative position change between each set of successive signals in the plurality of received signals, and instruct the control output to unlock access to the resource if the expected relative position change is consistent with the observed relative position change for each set of successive signals.

In an embodiment estimating a first and a second position of the remote key comprises applying a signal source localisation technique to a signal received by the plurality of antennas.

In a further embodiment the processor is configured to instruct the control output to unlock access to the resource if a number of failed attempts associated with a sender identification number is above a predetermined threshold.

In the following description the remote key entry system will be described with reference to it being used within a vehicle however for the avoidance of doubt it is emphasized that the remote key entry system could be used in any environment which requires secure remote key entry. For example, the methods and systems disclosed herein could also be used when controlling access to stock in a warehouse or a high-security area such as a laboratory.

Figure 1A:
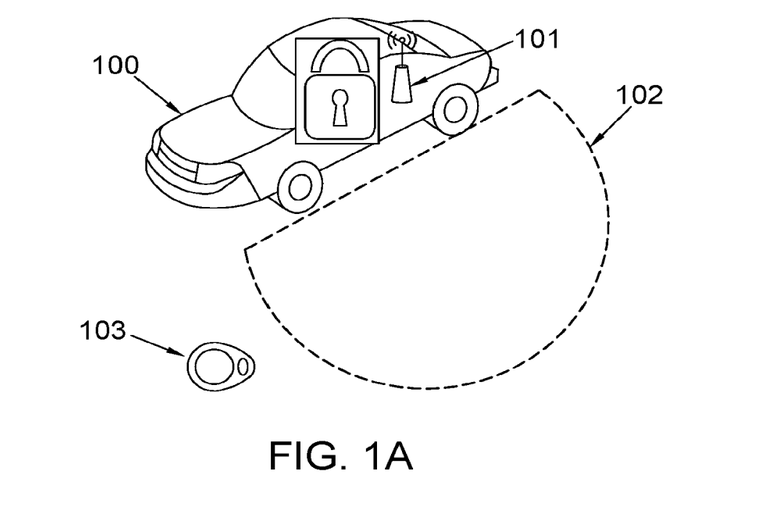
FIG. 1A shows a known remote key entry system in a locked state.

FIG. 1A shows a known remote key entry system in a locked state. FIG. 1A shows a car 100 comprising a control unit 101. The control unit 101 is configured to transmit signals to, and receive signals from the remote key 103. If the remote key 103 is outside the transmission and reception range of the control unit 101, represented by the boundary 102, then the control unit 101 will not unlock vehicle access or functionality, irrespective of whether the remote key 103 is associated with an authorised user.

Figure 1B:
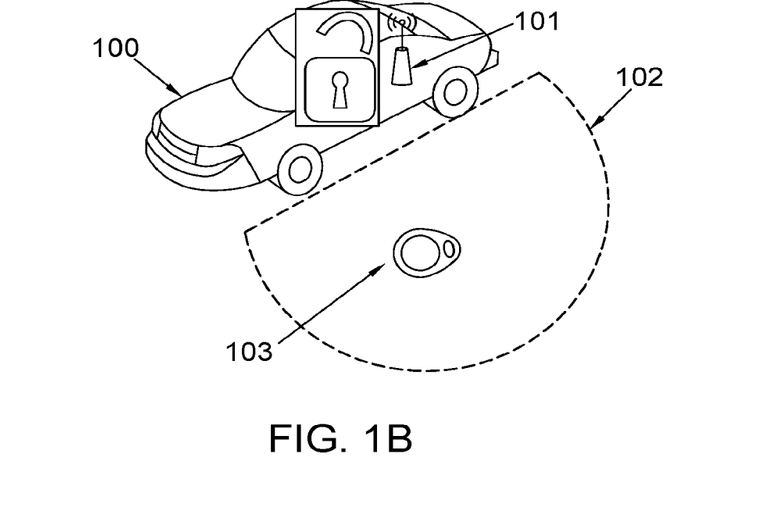
FIG. 1B shows a known remote key entry system in an unlocked state.

FIG. 1B shows a known remote key entry system in an unlocked state. FIG. 1B uses similar reference numerals as FIG. 1A to indicate similar components and as such a description of the repeated components will be omitted. Unlike FIG. 1A, in FIG. 1B the remote key 103 is within the boundary 102 of the control unit 101. Once the remote key 103 is within a range of the control unit 101 there is an exchange of authorisation messages between the remote key 103 and the control unit 101. An authorisation message typically contains data which enables the control unit 101 to determine whether the remote key is authorised to unlock vehicle access or functionality. The control unit 101 is configured to unlock access to, and/or the functionality of, the vehicle 100 upon determining that the remote key 103 belongs to an authorised user.

The exchange of authorisation messages discussed above occurs automatically. As a result a user is not required to press a button on the remote key 103, or manually unlock the vehicle 100 in order to access the vehicle 100. While remote key entry is undoubtedly convenient for the user it can also be exploited by an unauthorised user to gain access to the vehicle by way of a relay attack.

Figure 2:
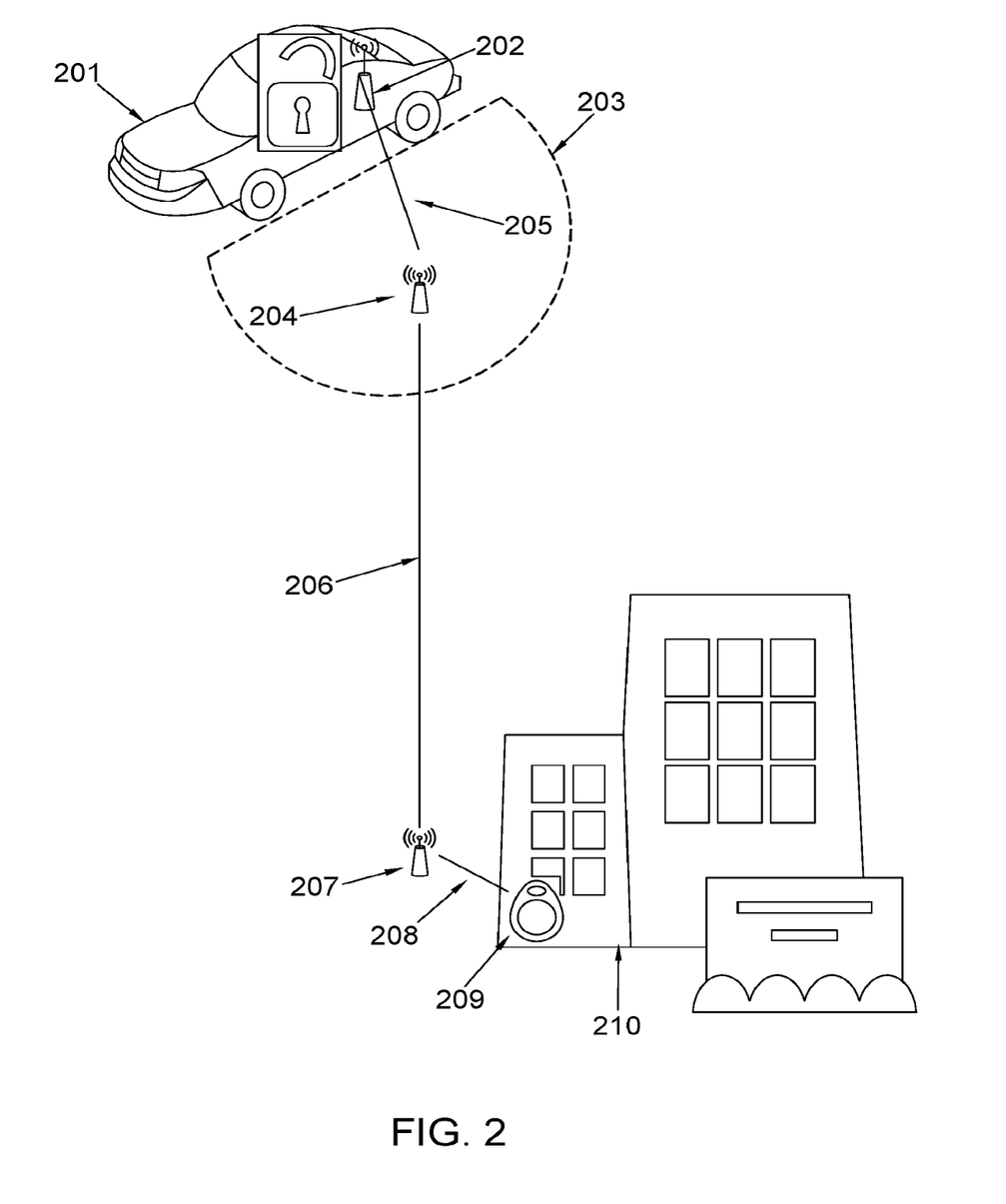
FIG. 2 shows a relay attack on a remote key entry system.

FIG. 2 shows a relay attack on a remote key entry system. FIG. 2 shows a vehicle 201 comprising a control unit 202. In FIG. 2 a remote key 209 of an authorised user is located within a building 210. The remote key 209 is outside the range of the control unit (represented by a boundary 203) and would therefore not routinely cause the control unit 202 to unlock access to the vehicle 201. FIG. 2 also shows a first transceiver 204 located within the range of the control unit 202 (i.e. within the boundary 203) as well as a second transceiver 207 located within the range of the remote key 209.

The first transceiver 204 is communicatively coupled to the control unit 202 via a first communication link 205. The first transceiver 204 is also communicatively coupled to the second transceiver 207 via a second communication link 206. The second transceiver 207 is also communicatively coupled to the remote key 209 via a third communication link 208. At least the first communication ink 205 and the third communication link 208 operate in the same frequency spectrum.

During a relay attack the first transceiver 204 and the second transceiver 207 replicate the signals transmitted by the control unit 202 and the remote key 209. In essence, the transceivers extend the range of the remote key 209 and the control unit 202 such that the control unit 202 perceives the first transceiver 204 to be the remote key 209 and the remote key 209 perceives the second transceiver 207 to be the control unit 202.

This is achieved by the second communication link 206 "relaying" the signals received by the first and second transceivers. The first and second transceivers subsequently transmit any signals received by the second communication link 206. In effect, copying the signals generated by the control unit 202 and the remote key 209. In this way an unauthorised party is able to trick the control unit 202 into unlocking access to the vehicle 201.

Figure 3:
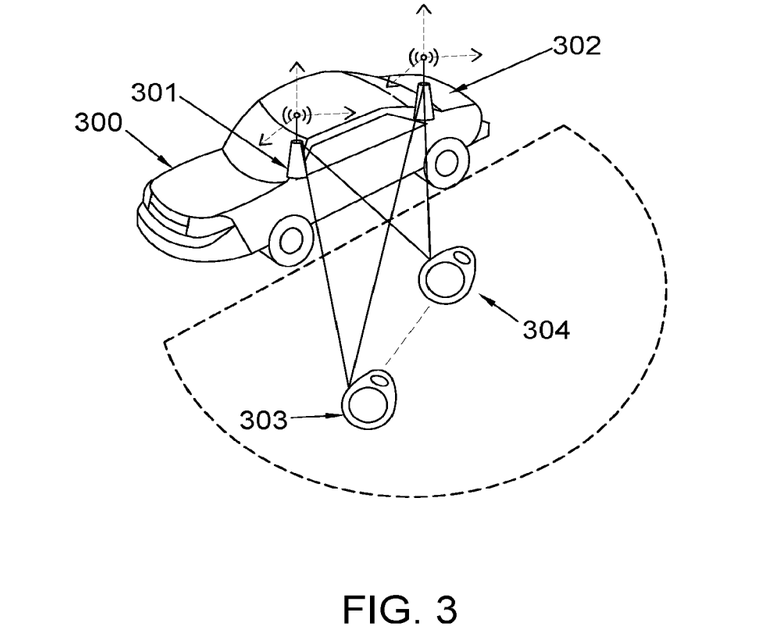
FIG. 3 shows a remote key entry system according to an embodiment.

FIG. 3 shows a remote key entry system according to an embodiment. FIG. 3 shows a vehicle 300 comprising a first antenna 301 and a second antenna 302. FIG. 3 shows a remote key at a first instant in time 303 and the same remote key at a second instant in time 304. The vehicle 300 also comprises a control unit (not shown) which is connected to both the first antenna 301 and the second antenna 302.

Before discussing the operation of the remote key entry system, the contents of the control unit and the remote key (303, 304) will be discussed in more detail.

Figure 4A:
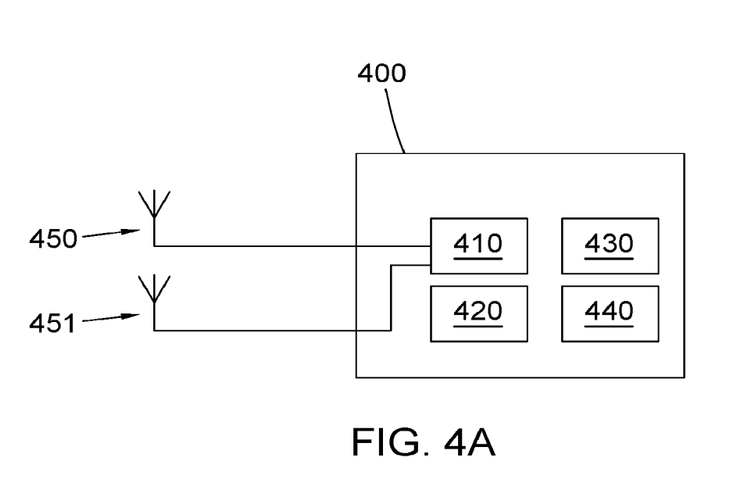
FIG. 4A shows a control unit according to an embodiment.

FIG. 4A shows a control unit according to an embodiment. The control unit comprises an RF input/output port 410, a microprocessor 420, a non-volatile memory 430 and a control output port 440. The RF input/output port 410 is communicatively connected to a plurality of antennas. FIG. 4A shows a first antenna 450 and a second antenna 451 communicatively connected to the RF input/output port 410. The RF input/output port 410 is configured to transmit and receive radio signals, preferably short range radio communication signals. The microprocessor 420 is coupled to non-volatile memory 430. Non-volatile memory 430 stores computer readable instructions that, when executed by the processor 420, cause the processor 420 to execute program steps that implement the methods described herein.

The processor 420 is also coupled to the control output port 440 which is configured to provide an indication of whether a remote key belonging to an authorised user is within a range of the first antenna 450 and the second antenna 451. In a further embodiment the control output port 440 transmits a signal which causes a vehicle to be unlocked. Optionally, the control output port 440 is configured to unlock access to the vehicle.

In another embodiment the first antenna 450, the second antenna 451 and the RF input/output port 410 are configured to receive short range radio signals at predetermined frequency. In a further embodiment the control unit is compatible with Remote Keyless Entry standards and operates at a frequency in the range of 300 MHz to 500 MHz, or more specifically either: 315 MHz or 433.92 MHz.

Whilst in the embodiments discussed above only two antennae are connected to the RF input/output port 410, it is emphasized that the RF input/output port 410 of the control unit 400 may be communicatively coupled to more than two antennae. Furthermore, although in FIG. 4A the plurality of antennae (450, 451) are shown to be situated outside of, but connected to, the control unit 400 it will be appreciated that in other embodiments the plurality of antennae (450, 451) are situated within the control unit 410.

Figure 4B:
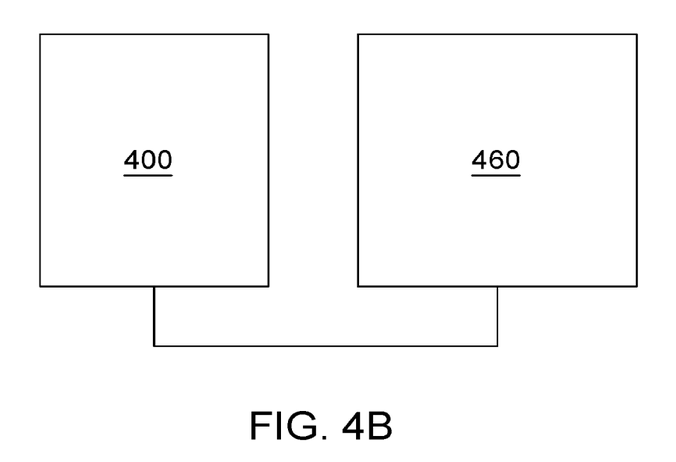
FIG. 4B shows a system comprising the control unit and a computing system.

FIG. 4B shows a system comprising the control unit 400 and a computing system 460. In FIG. 4B the control unit 400 is communicatively coupled to the computing system 460 which may be part of a vehicle's on-board computing system. In an embodiment the connection between the control unit 400 and the computing system 460 is established via the control output port 440 of the control unit 400.

In a further embodiment the control unit 400 and the computing system 460 are part of a different system which makes use of remote keyless entry. Including, but not limited to: a remote key entry system in a warehouse, school, office or house.

Figure 5:
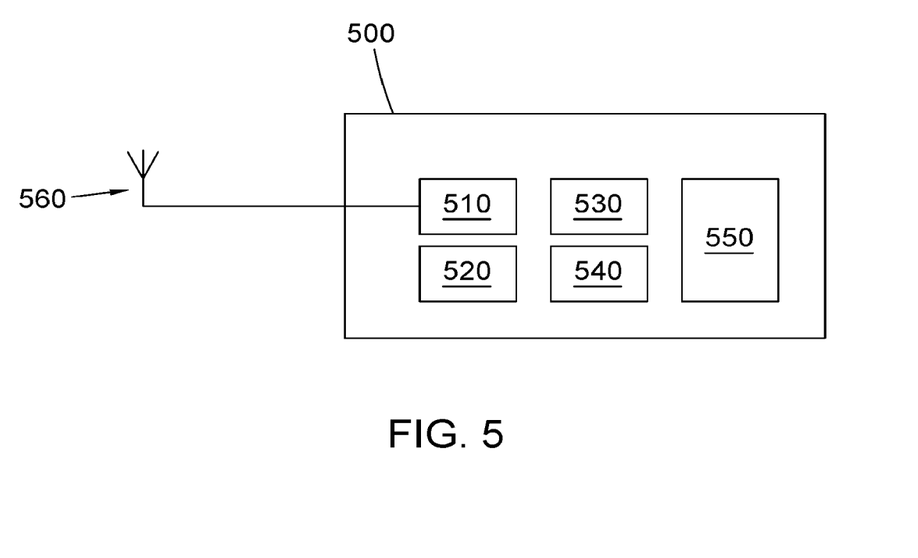
FIG. 5 shows a remote key according to an embodiment.

FIG. 5 shows a remote key according to an embodiment. The remote key 500 comprises an RF input/output port 510, a microprocessor 520, a non-volatile memory 530 and a power supply 540. The RF input/output port 510 is communicatively connected to an antenna 560. The microprocessor 520 is communicatively coupled to non-volatile memory 530. Non-volatile memory 530 stores computer readable instructions that, when executed by the microprocessor 520, cause the microprocessor 520 to execute program steps that implement the functionality of a remote key according to the methods described herein. In one embodiment the microprocessor 520 and the non-volatile memory 530 are contained within the same physical device such as a Peripheral Interface Controller (PIC).

The remote key 500 is configured to transmit radio frequency signals via the RF input/output port 510 and the antenna 560. Optionally, the remote key 500 is configured to receive radio frequency signals via the RF input/output port 510 and the antenna 560.

The remote key 500 also comprises a sensor module 550. The sensor module 550 comprises motion sensors which are configured to detect the movement of the remote key 500. In one embodiment the sensor module 550 comprises one of more of: an accelerometer, a gyroscope and a magnetometer. The sensor module 550 is coupled to the microprocessor 520 which is configured to record readings from the sensor module 550. In an embodiment this information is encoded in a signal for transmission by the RF input/output port 510 and the antenna 560.

In a further embodiment the readings from the sensor module are transformed from a local reference frame to the same reference frame as is used by the control unit of the remote key entry system before being transmitted. Optionally, readings from the sensor module are transformed into the earth frame (i.e. using the co-ordinate system North, East, Down) before being transmitted by the RF input/output port 510 and the antenna 560.

In a different embodiment readings from the sensor module 550 are used by the processor 520 to determine the expected relative position change over a short period of time. The expected relative position change is subsequently encoded in a signal for transmission by the RF input/output port 510 and the antenna 560.

Figure 6:
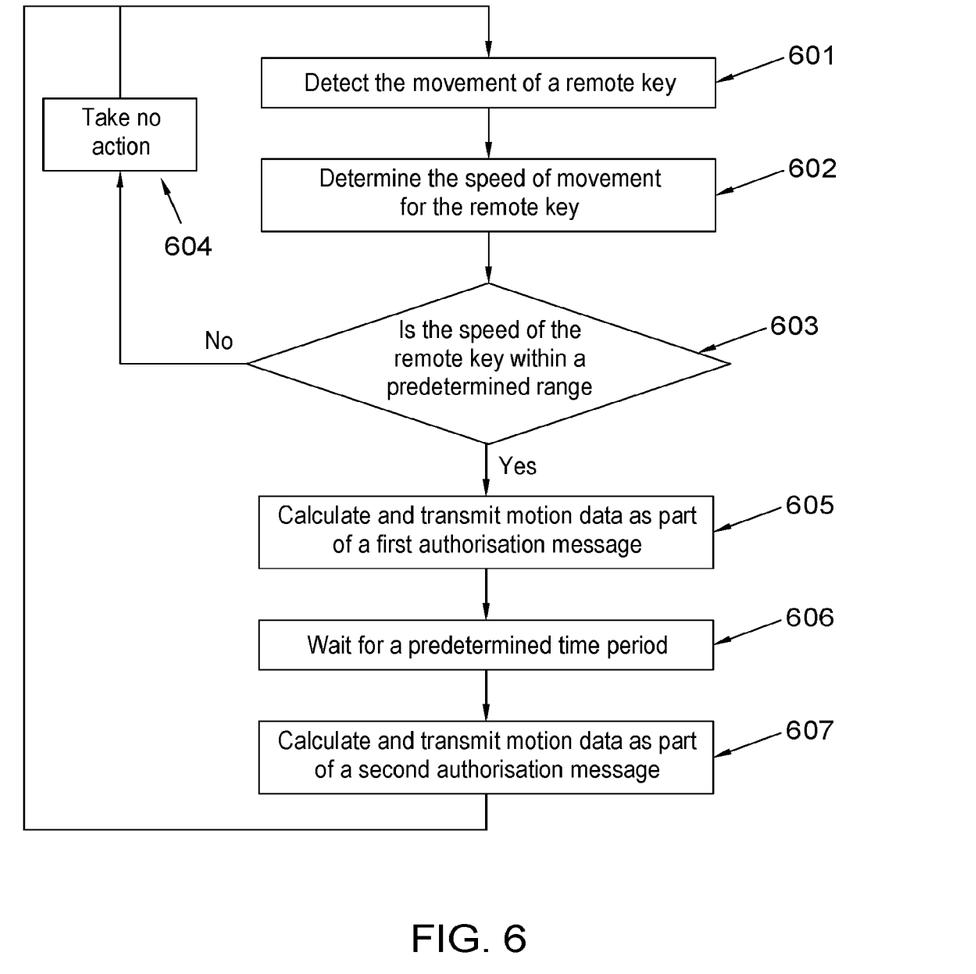
FIG. 6 shows a method of operating a remote key according to an embodiment.

FIG. 6 shows a method of operating a remote key according to an embodiment. The method begins in step 601 by detecting the movement of the remote key. In an embodiment this is achieved by monitoring the sensor module 550.

In step 602 the method determines the speed at which the remote key is moving. In step 603 the method determines whether the remote key is moving at a speed within a predetermined range. In one embodiment the predetermined range is set by the manufacturer of the remote key. In a further embodiment the predetermined range covers the range of walking speeds (e.g. from 1.0 metres/second to 1.6 metres/second).

If the remote key is moving at a speed which is not within the predetermined range then no action is taken in step 604 before returning to step 601. In an embodiment, if no action is taken 604 then the method waits for a predetermined time to pass before detecting movement of the remote key again in step 601.

If the remote key is moving at a speed within the predetermined range of acceptable speeds then the method proceeds to step 605. In step 605 motion data is calculated based on the movement of the remote key and this motion data is subsequently transmitted by the remote key as part of an authorisation message.

In a further embodiment the motion data comprises accelerometer, gyroscope and magnetometer readings from the sensor module. In this case the co-ordinate system used to convey motion data from the remote key is:

($A_x$, $A_y$, $A_z$, $G_x$, $G_y$, $G_z$, M) where:

$A_x$, $A_y$, $A_z$ are readings generated by the accelerometer and represent the acceleration of the sensor module in the x, y and z directions respectively;

$G_x$, $G_y$, $G_z$ are readings generated by the gyroscope and represent the rotational motion of the sensor module in the x, y and z directions respectively; and M is a reading generated by the magnetometer and represents a direction, strength or relative change in a magnetic field experienced by the sensor module.

In a further embodiment the motion data is converted from a local reference frame (i.e. $A_x$, $A_y$, $A_z$, $G_x$, $G_y$, $G_z$, M) to the same reference frame as is used by the control unit of the remote key entry system before being transmitted. Optionally, readings from the sensor module are transformed into the earth frame (i.e. using the co-ordinate system North, East, Down) before being transmitted.

In a different embodiment the motion data comprises an expected relative position change generated based on readings from the sensor module. Optionally, the expected relative position change is in the earth frame (i.e. using the co-ordinate system North, East, Down).

In another embodiment the motion data forms part of an encrypted message transmitted by the remote key.

After transmitting the motion data in step 605 the method waits for a predetermined time period 606. In an embodiment this predetermined time period is set by the manufacturer of the remote key. After the predetermined time period has elapsed the method measures and transmits motion data as part of a second authorisation message 607. Although in FIG. 6 only a first and a second authorisation message are transmitted, it is emphasised that the method may involve transmitting more than two authorisation messages.

In FIG. 6 the authorisation messages are sent by the remote key as part of a passive system. In a passive system authorisation messages are transmitted by the remote key automatically. In a further embodiment the method is adapted to send authorisation messages as part of an active system where the control unit transmits a request for authorisation messages and upon receipt of this message, the remote key transmits a first and a second authorisation message. In yet another embodiment authorisation messages are only sent by the remote key when the remote key is moving at a speed in a predetermined range and a request for authorisation messages has been received by the remote key.

Figure 7:
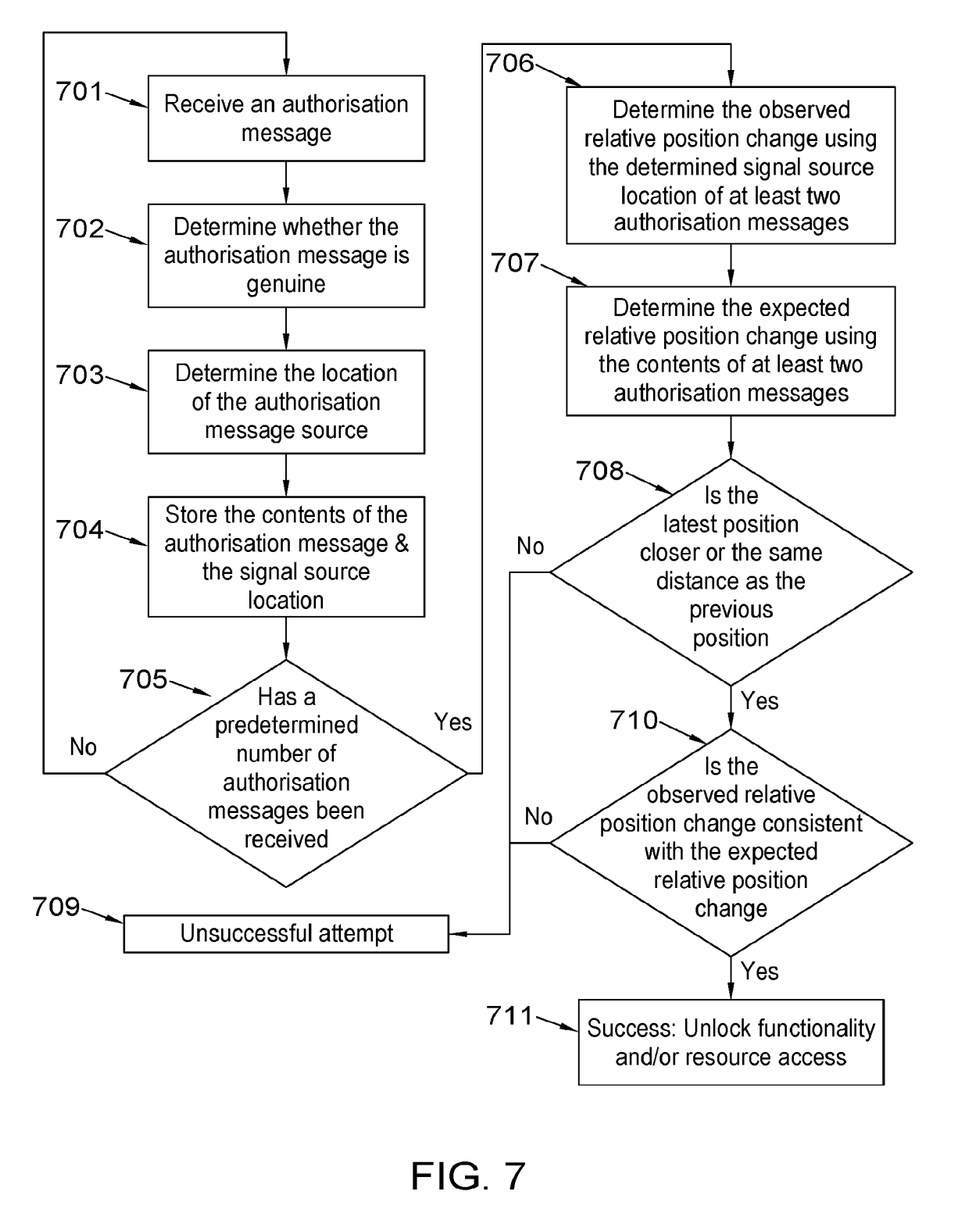
FIG. 7 shows a method of operating the control unit according to an embodiment.

FIG. 7 shows a method of operating the control unit according to an embodiment. The method begins in step 701 by receiving an authorisation message from a remote key. While FIG. 7 shows the operation of the control unit in a 'passive' system (i.e. a system where the remote key is not prompted by the control unit to transmit an authorisation message) it will be understood that the method could also be used as part of an active system. In an active system the method of FIG. 7 is adapted so that the method begins by transmitting a request for authorisation messages from the control unit before the remote key receives the authorisation message in step 701.

After receiving an authorisation message from the remote key the method determines whether the authorisation message is genuine as shown in step 702. In an embodiment determining whether the authorisation message is genuine comprises decoding the authorisation message and determining whether the contents of the message match a predetermined message format. In a further embodiment determining whether the authorisation message is genuine comprises inspecting the contents of the authorisation message, obtaining a value for the 'sender ID' and determining whether the obtained 'sender ID' is associated with an authorised user.

In step 703 the method, implemented by the control unit, determines the location of the authorisation message source (i.e. the location of the remote key). This can be achieved using various signal source location techniques including an ultra-low complexity solution based on U.S. non-provisional patent application Ser. No. 15/938,642 which is incorporated herein by reference. In this technique multiple antenna elements are used to calculate the direction of arrival for a signal. Other techniques could also be used to determine the location of the signal source including an in car WiFi (IEEE802.11mc) based system where the location of the signal source is determined based on the signal strength and the time of arrival.

In step 704 the contents of the authorisation message are stored along with the location of the signal source as determined in step 703. In an embodiment only the motion data contain within an authorisation message is stored by the control unit.

In step 705 it is determined whether a predetermined number of authorisation messages have been received by the control unit. In an embodiment the predetermined number of authorisation messages equals two. The method of remote key access presented herein generally involves verifying that the reported expected movement of the remote key is consistent with the movement of the remote key as observed by the control unit. As such it is necessary to obtain at least two authorisation messages to make this determination possible.

If the predetermined number of authorisation messages has not been received by the control unit then the method repeats from step 701. If the predetermined number of authorisation messages has been received by the control unit then the method proceeds to step 706.

In step 706 the observed relative position change of the signal source (i.e. the remote key) is determined based on the locations of the signal source determined for each authorisation message in step 703. In an embodiment an in car navigation system is used to determine the relative position change of the signal source in the earth frame (i.e. using the co-ordinate system North, East, Down).

In step 707 the expected relative position change is determined based on the contents of at least two authorisation messages received by the control unit in step 701. As previously discussed, the authorisation messages comprise motion data.

In one embodiment the motion data comprises readings from the accelerometer, gyroscope and magnetometer. Known attitude and heading reference system algorithms are used to transform motion data into a specific frame of reference. These include algorithms based on quaternion rotation, as well as Mahony and Madgwick filters where raw data in a local reference frame (e.g. from the sensor module) is formed into a vector before being mapped, by a matrix, into another frame of reference (e.g. the earth frame).

In an embodiment the authorisation message (received in step 701) comprises motion data in the earth frame.

In a different embodiment the authorisation message (received in step 701) comprises motion data in a local frame of reference and the control unit transforms the motion data into a different (common) frame of reference (e.g. the earth frame).

Once the motion data contained within the authorisation message has been transformed to a common frame of reference the expected relative position change is calculated. In an embodiment the expected relative position change of the remote key in calculated in the earth frame (i.e. using co-ordinate system North, East, Down).

After determining the expected relative position change the method proceeds to step 708. In step 708 the method determines whether the most recent observed position of the remote key determined in step 703 is closer to the control unit than an observed position of the remote key determined in a previous execution of step 703 (i.e. for the previous authorisation message). In this way the method is able to determine whether or not the remote key is moving towards the control unit (and hence the vehicle).

If it is determined that the remote key is moving away from the control unit then vehicle access and/or functionality remains locked as shown in step 709. If it is determined that a remote key is moving towards the vehicle then the method proceeds to step 710.

In step 710 the expected relative position change is compared with the observed relative position change in order to determine whether these two measurements are consistent with each other. If the observed relative position change (obtained in step 706) and the expected relative position change (obtained in step 707) are in the same coordinate system (i.e. the earth frame) then this step can be achieved using a co-ordinate frame alignment. In a further embodiment the observed relative position change is consistent with the expected relative position change when both values are within a predefined error range or a threshold of each other. In another embodiment the observed relative position change is consistent with the expected relative position change when each axis in the co-ordination system for both measurements is within a predetermined error threshold of each other, for example when each axis in the expected relative position change is within a percentage error of the respective axis in the observed relative position change. Alternatively the measure of consistency is based on a percentage error from the expected relative position change. In a further embodiment the percentage error is 10%.

If the expected relative position change is consistent with observed relative position change then the method proceeds to step 711.

In step 711 access to and/or the functionality of the vehicle is unlocked.

If the expected relative position change is not consistent with the observed relative position change then the method proceeds to step 709 registering an unsuccessful attempt at unlocking the vehicle. In an embodiment the number of unsuccessful attempts is recorded and if the number of unsuccessful attempts is greater than a predetermined value then the method will ignore any further attempts to unlock the vehicle. Optionally, once the threshold of unsuccessful attempts has been reached the remote key is deactivated. In a further embodiment the predetermined threshold equals a rate of unsuccessful attempts, or in other words, the remote key is deactivated after a given number of unsuccessful attempts over a predetermined time period.

In an embodiment deactivating the remote key comprises discarding, by the control unit, any further attempts at remote access by the remote key. Additionally or alternatively deactivating the remote key comprises transmitting, by the control unit, a signal which causes the remote key to stop transmitting authorisation messages.

In a further embodiment the relative position change is compared with a personal movement signature in order to determine whether the remote key is held by an authorised user. In this embodiment samples of an authorised user's movement signature are obtained in a secure set up environment and are subsequently stored in the control unit. Before unlocking the vehicle the stored movement signature for a given 'sender ID' is compared to the motion data contained within the authorisation messages. If the motion data is consistent with the movement signature then the vehicle is unlocked.

Optionally, the movement signature also comprises a characteristic of received signal (i.e. the signal which conveys the authorisation message). For example, the personal movement signature may comprise a sequence of micro-Doppler changes in the received signal.

Figure 8A:
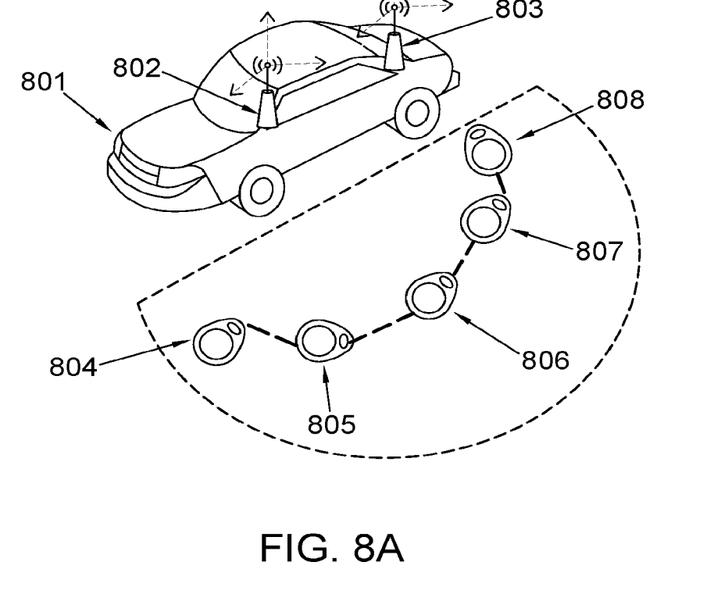
FIG. 8A shows an application of the remote key entry system according to an embodiment.

FIG. 8A shows an application of the remote key entry system according to an embodiment. FIG. 8A shows a vehicle 801 comprising a control unit (not shown) which operates in accordance with the method of FIG. 7. The vehicle 801 also comprises a first antenna 802 and a second antenna 803 which are connected to the control unit. FIG. 8A shows a remote key at a first position 804, the remote key at a second position 805, the remote key at a third position 806, the remote key at a fourth position 807 and the remote key at a fifth position 808.

Referring back to the method shown in FIG. 7, in step 701 the control unit receives an authorisation message from the remote key at a first position 804. The control unit subsequently determines whether the authorisation message is genuine based on the contents of the authorisation message (e.g. whether the "sender ID" contained within the authorisation message is associated with an authorised user). Since the remote key shown in FIG. 8A is associated with an authorised user the method proceeds to step 703 where the position of the remote key is determined by the control unit (in this example, by using the first antenna 802 and the second antenna 803). After determining the location of the message source (i.e. the remote key) the control unit subsequently stores this information along with the motion data contained within the received authorisation message.

The control unit subsequently determines whether a predetermined number of authorisation messages have been received from the remote key. In order to unlock access or functionality the method requires the expected relative position change generated using motion data from the remote key to be consistent with the observed relative position change measured by the control unit. As a result the method requires at least two authorisation messages to be received by the control unit before such a determination can be made. In light of this the minimum number of authorisation messages required in step 705 is two however it is emphasized that any number greater than two could be used.

In the example of FIG. 8A the method requires five authorisation messages to be received by the control unit before comparing the expected relative position change with the observed relative position change. As a result steps 701, 702, 703 and 704 are repeated four further times (five times in total). The second loop corresponding to the message received at the second position 805, the third loop corresponding to the message received at the third position 806, the fourth loop corresponding to the message received at the fourth position 807 and the fifth loop corresponding to the message received at the fifth position 808. Having received the predetermined number of authorisation messages the method proceeds to step 706.

In step 706 the control unit determines the observed relative position change of the remote key based on the location of the authorisation message source determined by the control unit in step 703. One way to determine the observed relative position change is to calculate the straight-line distance between the determined location of the first authorisation message (i.e. 804) and the determined location of the fifth authorisation message (i.e. 808).

After determining an observed relative position change based on measurements obtained by the control unit, the control unit subsequently determines an expected relative position change based on the motion data contained within the authorisation messages received from the remote key.

Figure 8B:
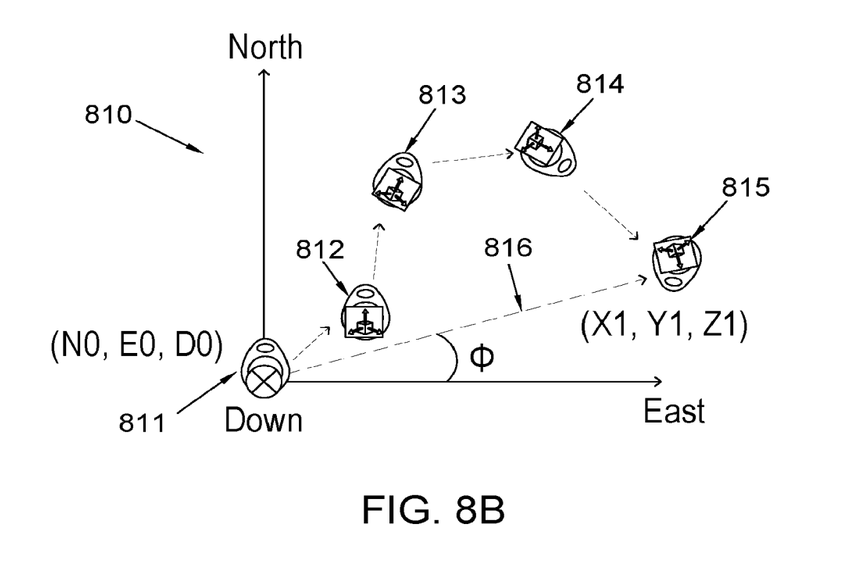
FIG. 8B shows a graphical representation of the motion data received from a remote key according to an embodiment.

FIG. 8B shows a graphical representation of the motion data received from a remote key according to an embodiment. FIG. 8B shows a graphical representation 810 in the earth frame (i.e. using axis North, Down, East) of the motion data contained within an authorisation message. In FIG. 8B the motion data is displayed relative to the position of a first authorisation message 811. FIG. 8B also shows an expected relative position of a second authorisation message 812, an expected relative position of a third authorisation message 813, an expected relative position of a fourth authorisation message 814 and an expected relative position of a fifth authorisation message 815. Since the embodiment described above uses five authorisation messages; the expected relative position change is determined by calculating the straight-line distance between the expected relative position of the first authorisation message 811 and the expected relative position of the fifth authorisation message 815. The expected relative position change between these two authorisation messages is shown by reference numeral 816.

As previously discussed, if the relative position change of the remote key observed by the control unit (i.e. between the first authorisation message 804 and the second authorisation message 808) is consistent with the expected relative position change 816 based on the motion data reported in the authorisation messages received from the remote key (i.e. using the motion data contained within the first message 811 and the fifth message 815) then vehicle access and/or functionality will be unlocked.

Although in FIG. 8B the frame of reference is the earth frame (i.e. coordinate axis: North, Earth, Down) it is emphasized that any co-ordinate systems could be used provided that it is possible to compare the expected relative position change with the observed relative position change.

In the example discussed above the observed relative position change and the expected position change are generated based on a straight light distance between a first observation/measurement (i.e. 804 and 811) and a final observation/measurement (i.e. 808 and 815).

In a further embodiment the method of operating a remote key entry system determines whether the observed relative position change is consistent with the expected relative position change by comparing the distance between successive authorisation messages of the plurality of authorisation messages. For example, by comparing the observed relative position change and the expected position change between the $1^{st}$ and $2^{nd}$ position (i.e. 804 to 805 and 811 to 812), the $2^{nd}$ and $3^{rd}$ position (i.e. 805 to 806 and 812 to 813), the $3^{rd}$ and $4^{th}$ position (i.e. 806 to 807 and 813 to 814), and the $4^{th}$ and $5^{th}$ position (i.e. 807 to 808 and 814 to 815). In this example, only if the observed and expected relative position changes are consistent between each position does the control unit unlock vehicle access and/or functionality.

Figure 9:
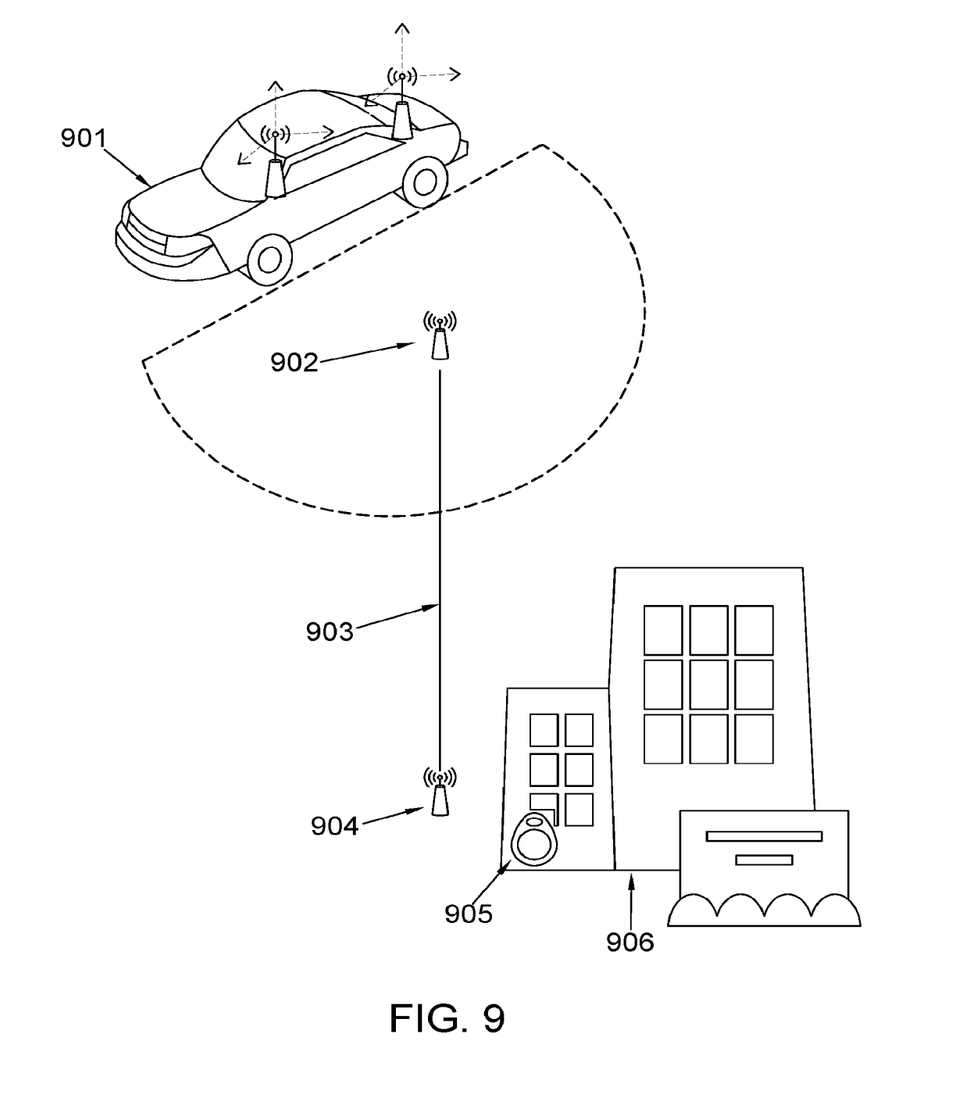
FIG. 9 shows an attempted relay attack on a remote key access system which is configured according to an embodiment.

FIG. 9 shows an attempted relay attack on a remote key access system which is configured according to an embodiment. FIG. 9 shows a first relay station 902 which is communicatively coupled to a vehicle 901. The first relay station is also communicatively coupled via a relay link 903 to a second relay station 904. The second relay station is within the vicinity of a building 906 comprising a remote key 905 that is configured according to the embodiments discussed herein.

Since the remote key 905 is only activated when it is in a moving state, and optionally when the remote key is moving in the walking speed range, the remote key 905 will not respond to any requests for authorisation messages which are transmitted by the vehicle 901 even though these messages could be received by the remote key due to the relaying of signals by the first transceiver 902 and the second transceiver 904. In this way the systems and methods discussed herein prevent a conventional relay attack where a remote key is stationary at home or in the workplace. Furthermore, by only activating the remote key 905 when it is in a moving state, the remote key 905 saves energy and prolongs battery life.

The systems and methods disclosed herein can also prevent relay attacks, even when an attacker knows how the system operates.

Figure 10:
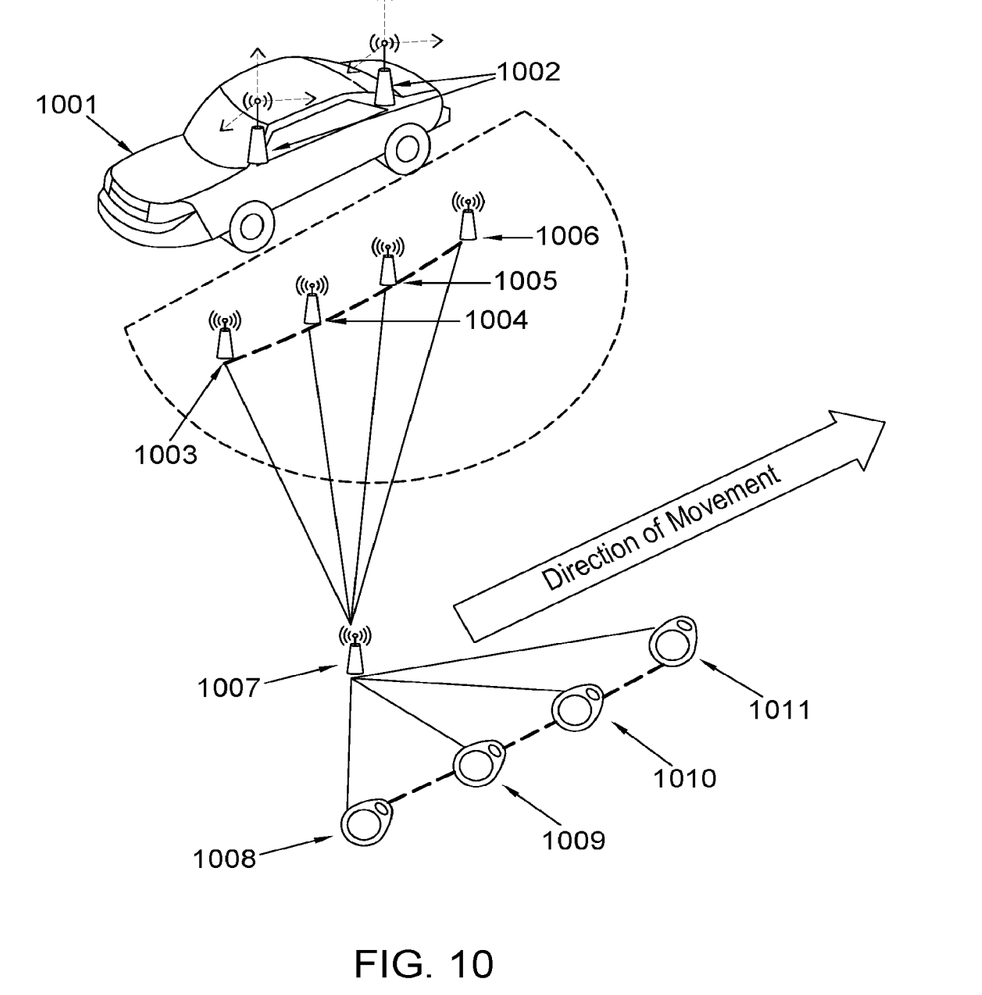
FIG. 10 shows an attempted relay attack on a remote key access system which is configured according to an embodiment.

FIG. 10 shows an attempted relay attack on a remote key access system which is configured according to an embodiment. FIG. 10 shows a vehicle 1001 comprising a control unit with two antennae 1002. FIG. 10 shows a first relay station in a first position 1003, the first relay station in a second position 1004, the first relay station in a third position 1005 and the first relay station in a fourth position 1006. Each of the locations being within a communicative range of the control unit 1002. The first relay station (1003, 1004, 1005, 1006) is communicatively coupled to a second relay station 1007. The second relay station 1007 is communicatively coupled to a remote key having: a first position 1008, a second position 1009, a third position 1010 and a fourth position 1011.

Since the remote key (1008, 1009, 1010, 1011) is only activated when it is in a moving state the only time when the system could be vulnerable to a relay attack is when the remote key is moving, optionally at a walking pace. In order to successfully unlock the vehicle 1001 using a relay attack it would be necessary for the first relay station (1003, 1004, 1005, 1006) to move in a manner which is identical to, or at least consistent with, the manner in which the remote key is moving (1008, 1009, 1010, 1011). As will be appreciated, this is very difficult to achieve in practice not least because it relies on an attacker at the second relay station 1007 directing an attacker at the first relay station (1003, 1004, 1005, 1006) to move in a certain way. In this scenario an attacker's reaction time will likely lag behind the movement of the remote key (1008, 1009, 1010, 1011) and therefore result in an unsuccessful attempt since the expected relative movement of the remote key is not consistent with the relative movement observed by the control system.

In this way the methods and systems described herein are resilient to relay attacks even when the remote key entry mechanism is known by an attacker.

Furthermore the systems and methods disclosed herein do not require changes to the communication protocol; instead the necessary additions can be integrated into existing protocols and even combined with other signal characteristic based remote key entry systems in order to achieve a higher level of performance or an addition layer of security.

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A method of remotely controlling access to a resource comprising:

receiving a first signal and a second signal from a remote key, wherein the first signal comprises first motion data and the second signal comprises second motion data, and wherein the remote key only transmits the first signal and the second signal if the remote key is being moved;

calculating an expected relative position change of the remote key based on the first motion data and the second motion data;

estimating a first and a second position of the remote key based on a characteristic of the first and the second signal respectively;

calculating an observed relative position change based on the difference between the first and the second position; and unlocking access to the resource if the remote key is being moved towards the resource and if the expected relative position change is consistent with the observed relative position change.

2. A method according to claim 1 wherein the first signal is a least recent signal received from the remote key and the second signal is a most recent signal received from the remote key.

3. A method according to claim 2 wherein each signal further comprises a sender identification number and wherein unlocking access to the resource further comprises determining if the sender identification number is associated with an authorised user.

4. A method according to claim 3 further comprising comparing the expected relative position change with a movement signature associated with the sender identification number and wherein access to the resource is unlocked if the movement signature is consistent with the expected relative position change.

5. A method according to claim 4 further comprising:

transmitting a first and a second authorisation message request, and wherein the remote key transmits the first and the second signal in response to receiving the first and the second authorisation message request respectively.

6. A method according to claim 1 further comprising:

receiving a third signal from the remote key;

calculating an expected relative position change and an observed relative position change between each set of successive signals in the received signals; and unlocking access to the resource if the expected relative position change is consistent with the observed relative position change for each set of successive signals.

* * * * *